UNITED STATES PATENT OFFICE.

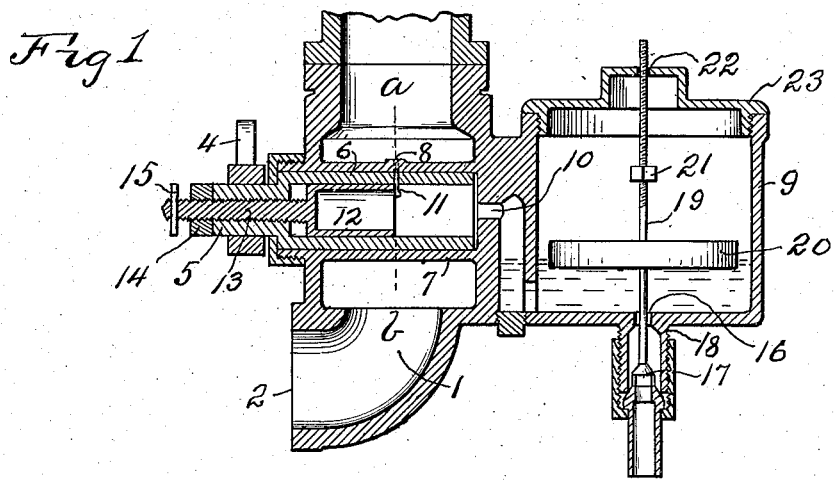

GARDNER E. MOREHOUSE, OF KANSAS CITY, MISSOURI.

CARBURETER.

No. 920,979.      Specification of Letters Patent.      Patented May 11, 1909.

Application filed January 25, 1908. Serial No. 412,576.

*To all whom it may concern:*

Be it known that I, GARDNER E. MOREHOUSE, a citizen of the United States, and a resident of Kansas City, in the county of Jackson and State of Missouri, have invented certain new and useful Improvements in Carbureters, of which the following is a specification.

My invention relates to improvements in carbureters.

The object of my invention is to provide a construction in which the hydrocarbon vapor shall always be mixed with the proper amount of air and which may be readily manipulated by an unskilled operator.

My invention provides further, novel means for automatically controlling the feed of the liquid fuel.

The novel features of my invention are hereinafter fully described and claimed.

In the accompanying drawings illustrating my invention—Figure 1 is a central, vertical sectional view. Fig. 2 is a top view, the cover for the supply chamber being removed. Fig. 3 is a cross section on the dotted line *a—b* of Fig. 1. Fig. 4 is a front elevation. Fig. 5 is a top view of the tubular valve.

Similar characters of reference denote similar parts.

1 denotes the mixing chamber provided at its lower end with an air inlet 2 which is controlled by a closure 3 secured to a crank arm 4, fastened upon the horizontal stem 5 of a horizontal tubular valve 6 which is rotatively fitted in a horizontal, cylindrical valve chamber 7, which extends horizontally across the mixing chamber 1 and is provided in its upper side with one or more peripheral openings 8 which discharge into the mixing chamber 1. At one side of the mixing chamber is the supply chamber 9 provided with a lateral, horizontal discharge opening 10, which communicates with the valve chamber 7 and with the interior of the valve 6 which has an open end adjacent said discharge opening 10. The valve 6 is provided with a transverse, peripheral slot 11, adapted to register with the openings 8. For adjustably regulating the flow through the slot 11 a cylindrical closure 12 is rotatively fitted in the valve 6 and is provided at one end with a screw threaded axial stem 13, fitted in an axial screw threaded hole in the valve stem 5. The stem 13 extends through the stem 5 and has mounted on it a lock nut 14 for bearing against the stem 5 to retain the closure 12 in such position as it may be adjusted. A transverse pin 15 in the outer end of the stem 13 serves as a finger hold for turning the valve 12.

The bottom of the supply chamber 9 is provided with a vertical inlet 16 adapted to be closed by valve 17 located in the supply pipe 18 and carried by a valve stem 19 slidable in a float 20 which is supported by the liquid in the supply chamber 9. The upper end of the stem 19 is screw threaded and extends through a vertical hole 22 provided centrally in the screw threaded cover 23 of the supply chamber 9. On the screw threaded portion of the stem 19 is a nut 21 by the adjustment of which, on the stem 19, may be determined the height to which the float can rise.

In the operation of my invention the closure 12 is adjusted to the proper position suitable for the power of the engine by rotating the stem 13 until the slot 11 is closed the proper amount, after which the nut 14 is locked against the stem 5. By swinging the crank arm or lever 4 in the proper direction the slot 11 may be moved to a position communicating with one or more of the openings 8, thus regulating the amount of liquid passing through said openings. The liquid fuel entering the supply chamber 9 will pass through the opening 10, valve 6, slot 11 and openings 8, into the mixing chamber 1, where it will vaporize and mix with the air entering the inlet 2. As the lever or arm 4 is swung to close one or more of the openings 8 the closure 2 will be swung to correspondingly close the air inlet 2, thus regulating the mixture of gas and vapor. The float 20 is vertically slidable on the stem 19 and when the liquid in the chamber 9 is slightly above the openings 8 the valve 20 will have come in contact with the nut 21 and have raised the valve 17 to close the inlet 16. As the liquid lowers the valve 20 will lower and permit the valve 17 also to lower. Flooding of the mixing chamber will thus be avoided.

Various modifications of my invention may be made within the scope of the appended claims without departing from its spirit.

Having thus described my invention, what I claim and desire to secure by Letters Patent is:—

1. In a carbureter, the combination with a cylindrical valve chamber having one or more peripheral outlet openings, of a liquid supply chamber having a discharge opening communicating with said valve chamber and provided with an inlet opening, automatically actuated means for closing said inlet opening when the liquid in the supply chamber has reached a pre-determined level, a tubular valve rotatively fitted in said valve chamber and having its interior communicating with said discharge opening and having a peripheral slot for registering with said peripheral outlet openings, and adjustable means for more or less closing said slot.

2. In a carbureter, the combination with a cylindrical valve chamber having an inlet and one or more peripheral outlet openings, of a supply chamber communicating with said inlet opening and itself having an inlet opening, a valve for closing the inlet opening of the supply chamber, and a float in said supply chamber for moving said valve to the closed position, and a tubular valve rotatively fitted in the valve chamber and having its interior communicating with the inlet to said valve chamber and provided with a peripheral slot for registering with the peripheral openings in the valve chamber.

3. In a carbureter, the combination with a mixing chamber having an air inlet, of a cylindrical valve chamber extending transversely across the mixing chamber and provided on its upper side with one or more peripheral openings discharging into the mixing chamber and having at one end an inlet opening, a tubular valve rotatively fitted in said valve chamber and having an open end communicating with said inlet opening of the valve chamber, and provided with a peripheral slot for registering with said peripheral openings, and means connected with said valve for controlling the admission of air into said mixing chamber.

4. In a carbureter, the combination with a mixing chamber having an air inlet, of a cylindrical valve chamber extending horizontally across the mixing chamber and provided with one or more peripheral outlet openings and having at one end an inlet opening, a tubular valve rotatively fitted in said valve chamber and having an open end communicating with the inlet to the valve chamber and provided with a peripheral slot for registering with said peripheral openings, and a closure for said air inlet carried by said valve.

5. In a carbureter, the combination with a mixing chamber having an air inlet, of a cylindrical valve chamber extending horizontally across said mixing chamber and provided with one or more peripheral openings discharging into said mixing chamber, a supply chamber having an inlet and provided with a discharge opening communicating with said valve chamber, means controlled by the liquid entering the supply chamber for regulating the height of said liquid in said supply chamber, a tubular valve rotatively fitted in said valve chamber and having its interior communicating with the discharge opening of the supply chamber and provided with a peripheral slot for registering with said peripheral openings, and means controlled by said valve for regulating the admission of air into the mixing chamber.

6. In a carbureter, the combination with a mixing chamber having an air inlet, of a cylindrical valve chamber located in said mixing chamber and having one or more peripheral openings discharging into the mixing chamber and having an inlet, means for automatically regulating the admission of liquid fuel through the inlet of the valve chamber, a tubular valve rotatively fitted in said valve chamber and having its interior communicating with the inlet of the valve chamber and provided with a peripheral slot for registering with said peripheral openings, a closure for said air inlet actuated by said valve, and adjustable means for more or less closing said slot.

7. In a carbureter, the combination with a mixing chamber having an air inlet, of a cylindrical valve chamber located in said mixing chamber and having one or more peripheral openings discharging into said mixing chamber, a rotary valve fitted in said valve chamber and provided with an inlet opening and having a peripheral slot for registering with said peripheral openings, an adjustable closure for said slot, and means connected with said valve for controlling the admission of air into said mixing chamber.

8. In a carbureter, the combination with a mixing chamber having an air inlet, of a cylindrical valve chamber located in said mixing chamber and provided with one or more peripheral openings discharging into said mixing chamber, a tubular valve rotatively fitted in said valve chamber and having an inlet and provided with a peripheral slot for registering with said peripheral openings, a closure for said air inlet actuated by said valve, and a closure for said slot longitudinally adjustable in said valve.

9. In a carbureter, the combination with a mixing chamber having an air inlet, of a cylindrical valve chamber extending horizontally across said mixing chamber and provided on its upper side with one or more peripheral openings, a supply chamber having a discharge opening and an inlet, a valve controlling said inlet, a float controlling said valve and located in said supply chamber, a valve rotatively fitted in said valve chamber and provided with a peripheral slot for registering with said peripheral openings and having a chamber communicating with said slot and said discharge opening, adjustable means for closing said slot, and a closure for said air inlet carried by said valve.

10. In a carbureter, the combination with a mixing chamber having an air inlet, of a cylindrical valve chamber extending horizontally across said mixing chamber and having in its upper side one or more peripheral openings discharging into the mixing chamber, a tubular valve having a peripheral slot for registering with said peripheral openings, the valve being rotatively fitted in said valve chamber and provided with an inlet, said valve having a stem provided with an axial screw threaded hole, a closure for said air inlet carried by said valve, and a cylindrical closure for said slot rotatively fitted in said valve and having a screw threaded stem extending through and fitted to said screw threaded hole.

In testimony whereof I have signed my name to this specification in presence of two subscribing witnesses.

GARDNER E. MOREHOUSE.

Witnesses:
 WARREN D. HOUSE,
 E. B. HOUSE.